United States Patent [19]

Nosu et al.

[11] Patent Number: 5,677,364

[45] Date of Patent: Oct. 14, 1997

[54] CRYSTALLINE PROPYLENE POLYMER COMPOSITION

[75] Inventors: Tsutomu Nosu, Takamatsu; Yoshiharu Sawa, Sakaide, both of Japan

[73] Assignee: Kyowa Chemical Industry Co., Ltd., Kagawa-ken, Japan

[21] Appl. No.: 624,107

[22] Filed: Mar. 29, 1996

[30] Foreign Application Priority Data

Apr. 5, 1995 [JP] Japan ................................. 7-103198

[51] Int. Cl.$^6$ ................................................. C08K 3/10
[52] U.S. Cl. ............................................ 523/200; 524/434
[58] Field of Search ................................................. 524/434

[56] References Cited

U.S. PATENT DOCUMENTS 5,063,264  11/1991  Nakajima ................... 524/118

OTHER PUBLICATIONS

Tosoh Corp., Database WPI, Derwent Publications, Ltd., London, GB AN94–230723 JP-A-06166781 14 Jun., 1984.
Kyowa Kagaku Kogyo KK, Database WPI, Derwent Publications, Ltd., London, GB AN94–1639671 JP-A-06107717 19 Apr., 1994.

Primary Examiner—Peter D. Mulcahy
Attorney, Agent, or Firm—Wenderoth, Lind & Ponack

[57] ABSTRACT

A crystalline propylene polymer composition having improved resin flowability and processability, having remarkable resistance to color development (pinking) and excellent anti-rust property and heat stability, and comprising 100 parts by weight of a crystalline propylene polymer, 0.01 to 1 part by weight of an aromatic peroxide and 0.001 to 1 part by weight of a hydrotalcite compound of the formula (1), $$(Mg_y Zn_z)_{1-x} Al_x (OH)_2 (A)^{n-}_{x/2} \cdot m H_2 O \quad (1)$$

wherein $(A)^{n-}$ is an anion having a valence of n, x, y and z are numbers satisfying $y+z=1$, $0 \leq y \leq 0.9$, $0.1 \leq z \leq 1$ and $0.2 \leq x \leq 0.8$, and m is 0 or a positive number.

9 Claims, No Drawings

CRYSTALLINE PROPYLENE POLYMER COMPOSITION

FIELD OF THE INVENTION

The present invention relates to a crystalline propylene polymer composition having improved resin flowability and processability. More specifically, it relates to a crystalline propylene polymer composition which is improved in melt flow property and is greatly improved in the prevention of color development (pinking), anti-rust property and heat stability.

PRIOR ART OF THE INVENTION

In recent years, there has been a remarkable advance in the technology of activating to a high degree a highly active Ziegler catalyst formed of a solid catalyst containing magnesium and titanium and an organic aluminum compound. As a result, in the method of producing a propylene polymer in the presence of the above catalyst, there is omitted the step of removing the catalyst from the produced propylene polymer. For this reason, a propylene polymer contains several ppm to hundreds ppm of a residual halogen. When the propylene polymer is molded under heat, an acidic component such as hydrogen halide is generated, which causes a problem that it greatly corrodes a molding machine and a mold, or deteriorates the resin. For overcoming the above problem, there is utilized a hydrotalcite disclosed in JP-A-55-80447. On the other hand, a propylene polymer is inexpensive and excellent in mechanical properties, and it is therefore used for producing a variety of products such as a film, a sheet, a fiber, an injection-molded article, a molded article having a hollow portion inside, and the like.

The above hydrotalcite has the following formula (2).

$$Mg_{1-x}Al_x(OH)_2CO_3^{2-}{}_{x/2} \cdot mH_2O \tag{2}$$

However, the above hydrotalcite has the following problem. That is, when it is incorporated into a resin composition containing an aromatic peroxide as a molecular weight adjuster or a melt flow improver and when the resin composition is spun into a fiber (yarn) or injection-molded to produce an article having a complicated form, the spun fiber (yarn) or the molded article develops the color of pink or reddish brown.

A resin composition containing a crystalline propylene polymer obtained by the method using a Ziegler catalyst but excluding the step of removing the catalyst and an aromatic peroxide for improving the crystalline propylene polymer in processability is poor in the heat stability and anti-rust property due the presence of a halogen derived from the catalyst. Even if the hydrotalcite of the above formula (2) is incorporated, the resin composition causes pinking at a molding/processing time. It is effective for preventing the pinking to incorporate a phenol-containing, sulfur-containing or phosphorus-containing antioxidant and a metal fatty acid salt. However, these components degrade the anti-rust property and heat stability of the resin composition, and the resin composition may sometimes cause a problem of "bleed-out".

SUMMARY OF THE INVENTION

It is an object of the present invention to provide a crystalline propylene polymer composition improved in resin flowability and processability (moldability).

It is another object of the present invention to provide a crystalline propylene polymer composition which has increased melt flow properties and is remarkably improved in the prevention of color development (pinking), anti-rust property and heat stability.

It is further another object of the present invention to provide a resin composition which contains a crystalline propylene polymer and an aromatic peroxide and is improved in the pinking resistance, heat stability and anti-rust property of the crystalline propylene polymer.

According to the present invention, there is provided a crystalline propylene polymer composition comprising 100 parts by weight of a crystalline propylene polymer, 0.01 to 1 part by weight of an aromatic peroxide and 0.001 to 1 part by weight of a hydrotalcite compound of the formula (1),

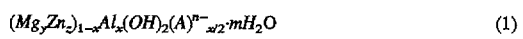

$$(Mg_yZn_z)_{1-x}Al_x(OH)_2(A)^{n-}{}_{x/2} \cdot mH_2O \tag{1}$$

wherein $(A)^{n-}$ is an anion having a valence of n, x, y and z are numbers satisfying $y+z=1$, $0 \leq y \leq 0.9$, $0.1 \leq z \leq 1$ and $0.2 \leq x \leq 0.8$, and m is 0 or a positive number.

DETAILED DESCRIPTION OF THE INVENTION

The present inventors have diligently studied to overcome the above problems and have found the following. When a specific hydrotalcite is incorporated into a propylene polymer composition, the propylene polymer composition is satisfactory in all of anti-rust property, heat stability and pinking resistance.

That is, the present invention provides a crystalline propylene polymer composition comprising 100 parts by weight of a crystalline propylene polymer, 0.01 to 1 part by weight of an aromatic peroxide and 0,001 to 1 part by weight of a hydrotalcite compound of the formula (1),

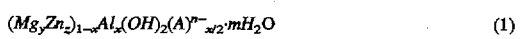

$$(Mg_yZn_z)_{1-x}Al_x(OH)_2(A)^{n-}{}_{x/2} \cdot mH_2O \tag{1}$$

wherein $(A)^{n-}$ is an anion having a valence of n, x, y and z are numbers satisfying $y+z=1$, $0 \leq y \leq 0.9$, $0.1 \leq z \leq 1$ and $0.2 \leq x \leq 0.8$, and m is 0 or a positive number.

The crystalline propylene polymer used in the present invention refers to a crystalline propylene polymer which is obtained by a method excluding the step of removing the catalyst and contains several ppm to hundreds ppm of a halogen. The propylene polymer includes a propylene homopolymer, a copolymer produced from propylene and other α-olefin and a copolymer produced from propylene and vinyl acetate, or the like. The other α-olefin includes ethylene, 1-butene, 1-pentene and 4-methylpentene-1. More specifically, the propylene polymer includes homopolypropylene, a propylene-ethylene block or random copolymer and a propylene-ethylene-1-butene copolymer.

The peroxide includes hydroperoxide, dialkyl peroxide, diacyl peroxide, peroxyester, peroxydicarbonate, ketone peroxide and peroxyketal. The aromatic peroxide used in the present invention refers to these peroxides which have a molecule containing a benzene ring.

The aromatic peroxide used in the present invention includes cumene hydroperoxide, diisopropylbenzene hydroperoxide, tert-butylcumyl peroxide, dicumyl peroxide, α,α'-bis(tert-butylperoxy-m-isopropyl)benzene, benzoyl peroxide, 2,4-dichlorobenzoyl peroxide, m-toluoyl peroxide, cumyl peroxyneodecanoate, tert-butyl peroxybenzoate, di-tert-butyldiperoxyisophthalate, 2,5-dimethyl-2,5-di(benzoylperoxy)hexane, cumyloxyperoctoate and cumyl peroxyneohexanoate.

In the present invention, of the above aromatic peroxides, it is particularly preferred to use those of which the 1 minute's half value period temperature is at least 70° C., since the resin composition can be homogeneously kneaded and the molecular chain of the resin is properly cut.

The hydrotalcite compound used in the present invention is a basic salt of magnesium, zinc and aluminum, represented by the following formula (1), $$(Mg_yZn_z)_{1-x}Al_x(OH)_2(A)^{n-}_{x/n} \cdot mH_2O \qquad (1)$$

wherein $(A)^{n-}$ is an anion having a valence of n, x, y and z are numbers satisfying $y+z=1$, $0 \leq y \leq 0.9$, $0.1 \leq z \leq 1$ and $0.2 \leq x \leq 0.8$, and m is 0 or a positive number.

In the above formula (1), $(A)^{n-}$ includes $CO_3^{2-}$, $HPO_4^{2-}$, $OH^-$, $ClO_4^-$, $NO_3^-$, acetate ion and tartarate ion.

The hydrotalcite compound of the formula (1) can be produced by the method disclosed in JP-B-46-2280, JP-B-47-32198 and JP-B-51-29129. The hydrotalcite compound of the formula (1) particularly preferably has a BET specific surface area of 30 m²/g or less and an average secondary particle diameter of 5 μm or less. When the crystalline propylene polymer has a high processing temperature, the hydrotalcite compound of the formula (1) may be calcined at a temperature of 150° to 350° C. before use, for preventing the foaming of the resin caused by the generation of gas.

The hydrotalcite compound of the formula (1) or the calcined product thereof may be surface-treated with a surface-treating agent. The surface-treating agent includes higher fatty acids such as stearic acid, higher fatty acid metal salts such as alkali metal salt of oleic acid, coupling agents such as silane-containing, aluminum-containing or titanate-containing coupling agents, higher fatty acid amides, higher fatty acid esters and wax.

The composition of the present invention may contain, as required, any one of a phenol-containing antioxidant, organic phosphoric acid antioxidants such as organic phosphite, a thioether-containing antioxidant, an ultraviolet light absorbent, hindered-amine-containing and nickel-containing light stabilizers, an antistatic agent, a lubricant such as calcium stearate, a nucleating agent and a colorant, which are all used with general polyolefins.

The present invention will be explained more in detail with reference to Examples hereinafter. In Examples, "part" stands for "part by weight".

EXAMPLES 1–6

The following components were mixed with a Henschel mixer at 1,200 rpm for 5 minutes, and then the mixture (composition) was melt-kneaded at 230° C. at 50 rpm and extruded to obtain pellets. The pellets were used for conducting the following tests. Table 1 shows the results.

Components

| | |
|---|---|
| Polypropylene-ethylene copolymer (Cl content = 30 ppm) | 100 parts |
| Dicumyl peroxide (DCP) | Amount changed |
| Hydrotalcite compound (HT) | Amount changed |
| Irganox 1010* | 0.05 part |
| Ultranox 626** | 0.05 part |

*Irganox 1010 = Pentaerythrityl-tetrakis[3-(3,5-di-tert-butyl-4-hydroxyphenyl)propionate]
**Ultranox 626 = Cyclic neopentantetraylbis(2,4-di-tert-butylphenyl) phosphite Anti-Rust Property A well-polished and deoiled soft steel plate having a size of 40×40 mm was buried in a sample of the above pellets and heated at 230° C. for 1 hour. Then, the soft steel plate and the sample were allowed to cool, the steel plate was taken out of the sample, and a resin on the steel plate surface was removed. The steel plate was placed in a desciccator adjusted to a relative humidity of 93%, and allowed to stand at 60° C. for 1 week. Then, the soft steel plate was visually evaluated for a degree of the occurrence of rust as follows.
1. No rust occurred.
2. Thin rust occurred partly.
3. Thin rust occurred wholly.
4. Thick rust occurred partly.
5. Thick rust occurred wholly.

Heat Stability

A sample of the above pellets was allowed to stand in an oven at 140° C. for 1 week while being mixed once a day. The deterioration of the resin was evaluated on the basis of melt flow rates (MFR) as follows. The sample was measured for melt flow rates before and after the sample was allowed to stand for the deterioration as described above, and the heat stability was expressed in terms of (MFR after the deterioration)/(MFR before the deterioration).

Prevention of Color Development

A sample of the above pellets was press-molded at 230° C. for 5 minutes to obtain a 2 mm thick plate, and the plate was measured for an "a value" with a color difference meter supplied by Tokyo Denshoku K.K. The a value shows a color change from green to red, and the greater the value is, the closer to red the color is.

TABLE 1

| Example | HT kind | HT Amount | DCP Amount | a value | Anti-rust property | MFR | MFR ratio |
|---|---|---|---|---|---|---|---|
| 1 | 1 | 0.1 | 0.2 | 0.0 | 1 | 27.3 | 1.06 |
| 2 | 2 | 0.1 | 0.1 | 0.2 | 1 | 25.0 | 1.05 |
| 3 | 3 | 0.1 | 0.1 | 0.1 | 1 | 26.5 | 1.04 |
| 4 | 2 | 0.01 | 0.1 | 0.1 | 2 | 6.8 | 1.05 |
| 5 | 2 | 1.0 | 0.2 | 0.3 | 1 | 22.5 | 1.05 |
| 6 | 2 | 0.1 | 0.3 | 0.3 | 1 | 46.0 | 1.08 |
| 7 | 2 | 0.005 | 0.2 | 0.4 | 2 | 30.4 | 1.08 |
| | Ca-St | 0.1 | | | | | |

Notes to Table 1

Amounts (part by weight) of HT and DCP: per 100 parts by weight of polypropylene/ethylene copolymer.

Kinds of HT:

$1 = Zn_{0.67}Al_{0.33}(OH)_2(CO)_{0.165} \cdot 0.51H_2O$ $2 = (Mg_{0.75}Zn_{0.25})_{0.67}Al_{0.33}(OH)_2(CO_3)_{0.165} \cdot 0.51H_2O$ $3 = (Mg_{0.50}Zn_{0.50})_{0.75}Al_{0.25}(OH)_2(CO_3)_{0.125} \cdot 0.63H_2O$ Ca-St: Calcium stearate (lubricant)

COMPARATIVE EXAMPLES 1–4

Pellets were prepared in the same manner as in Example 1 except that no hydrotalcite compound was used, that neither hydrotalcite compound nor DCP was used or that the hydrotalcite compound was replaced with calcium stearate (Ca-St) or a hydrotalcite compound $(Mg_{4.5}Al_2(OH)_{13}CO_3 \cdot 3.5H_2O)$ which came under the hydrotalcite compound of the formula (2), and the so-obtained pellets were evaluated in the same manner as in Example 1. Table 2 shows the results.

TABLE 2

| CEx. | HT or Ca-St Kind, Amount | DCP Amount | a value | Anti-rust property | MFR | MFR ratio |
|---|---|---|---|---|---|---|
| 1 | — 0 | 0 | 0.4 | 1 | 4.9 | 1.22 |
| 2 | — 0 | 0.1 | 0.3 | 5 | 28.6 | 1.33 |
| 3 | Ca-St 0.1 | 0.2 | 0.4 | 3 | 33.5 | 1.12 |
| 4 | 4 0.1 | 0.2 | 2.5 | 1 | 28.3 | 1.06 |

Notes to Table 2
CEx.=Comparative Example
HT used in CEx. 4=$Mg_{4.5}Al_2(OH)_{13}CO_3 \cdot 3.5H_2O$

EXAMPLE 7 AND COMPARATIVE EXAMPLE 5

0.05 Part of a phenol-containing antioxidant [octadecyl-3-(3,5-di-tert-butyl-4-hydroxyphenyl)propionate], 0.05 part of a phosphite-containing antioxidant [tris(2,4-di-tertbutylphenyl)phosphite], 0.15 part of tert-butyl peroxybenzoate (BPB) and either 0.1 part of the same hydrotalcite compound as that used in Example 2 or 0.1 part of the same hydrotalcite compound as that used in Comparative Example 4 were mixed with 100 parts of a polypropylene homopolymer with a Henschel mixer, and then the mixture (composition) was melt-kneaded at 260° C. at 30 rpm and extruded to obtain pellets. The pellets were press-molded at 230° C. for 5 minutes to obtain a 2 mm thick plate, and the plate was measured for an "a value" in the same manner as in Example 1. Table 3 shows the results.

TABLE 3

| | HT kind, Amount | BPB Amount | a value |
|---|---|---|---|
| Example 7 | 2 0.1 | 0.15 | 0.5 |
| Comparative Example 5 | 4 0.1 | 0.15 | 3.2 |

According to the present invention, there is provided a crystalline propylene polymer composition which hardly corrodes a metal of a mold, etc., is free from developing a pinkish color, and gives a molded article having excellent heat stability.

What is claimed is:

1. A crystalline propylene polymer composition comprising 100 parts by weight of a crystalline propylene polymer, 0.01 to 1 part by weight of an aromatic peroxide and 0.001 to 1 part by weight of a hydrotalcite compound of the formula (1), $$(Mg_yZn_z)_{1-x}Al_x(OH)_2(A)^{n-}{}_{x/2} \cdot mH_2O \qquad (1)$$

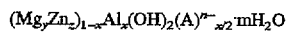

wherein $(A)^{n-}$ is an anion having a valence of n, x, y and z are numbers satisfying y+z=1, $0 \leq y \leq 0.9$, $0.1 \leq z \leq 1$ and $0.2 \leq x \leq 0.8$, and m is 0 or a positive number.

2. A composition according to claim 1, wherein the crystalline propylene polymer is a product produced in the presence of a Ziegler catalyst.

3. A composition according to claim 2, wherein the crystalline propylene polymer is a product which is produced without a step of removing the catalyst and contains several ppm to hundreds ppm of a halogen.

4. A composition according to claim 1, wherein the crystalline propylene polymer is a propylene homopolymer or a propylene copolymer.

5. A composition according to claim 1, wherein the aromatic peroxide has a molecule containing a benzene ring.

6. A composition according to claim 1, wherein the $(A)^{n-}$ is at least one member selected from the group consisting of $CO_3^{2-}$, $HPO_4^{3-}$, $OH^-$, $ClO_4^-$, $NO_3^-$, acetate ion and tartarate ion.

7. A composition according to claim 1, wherein the hydrotalcite compound of the formula (1) has a BET specific surface area of 30 $m^2/g$ or less and an average secondary particle diameter of 5 μm or less.

8. A composition according to claim 1, wherein the hydrotalcite compound of the formula (1) is a product surface-treated with at least onemember selected from the group consisting of higher fatty acids, higher fatty acid metal salts, coupling agents, higher fatty acid amides, higher fatty acid esters and wax.

9. A composition according to claim 1, wherein the hydrotalcite compound of the formula (1) is a product calcined at 150° to 350° C.

* * * * *

UNITED STATES PATENT AND TRADEMARK OFFICE
CERTIFICATE OF CORRECTION

PATENT NO.   : 5,677,364
DATED        : October 14, 1997
INVENTOR(S)  : TSUTOMU NOSU and YOSHIHARU SAWA It is certified that error appears in the above-identified patent and that said Letters Patent is hereby corrected as shown below:

Column 6 at line 28, change "$HPO_4^3$" to read --$HPO_4^2$--;

at line 36, change "onemember" to read --one member--.

Signed and Sealed this

Fourteenth Day of April, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,677,364
DATED : October 14, 1997
INVENTOR(S) : TSUTOMU NOSU and YOSHIHARU SAWA It is certified that error appears in the above-identified patent and that said Letters Patent is hereby corrected as shown below:

Column 3, line 11, change the word "artion" to read --anion--.

Column 6, line 28, change the term "CO3$^{2-}$" to read --$CO_3^{2-}$"--.

Signed and Sealed this

Ninth Day of March, 1999

Attest:

Attesting Officer

Q. TODD DICKINSON

Acting Commissioner of Patents and Trademarks